C. L. RAWDON.
Neck-Yoke.
No 9,201.
Patented Aug 17, 1852.
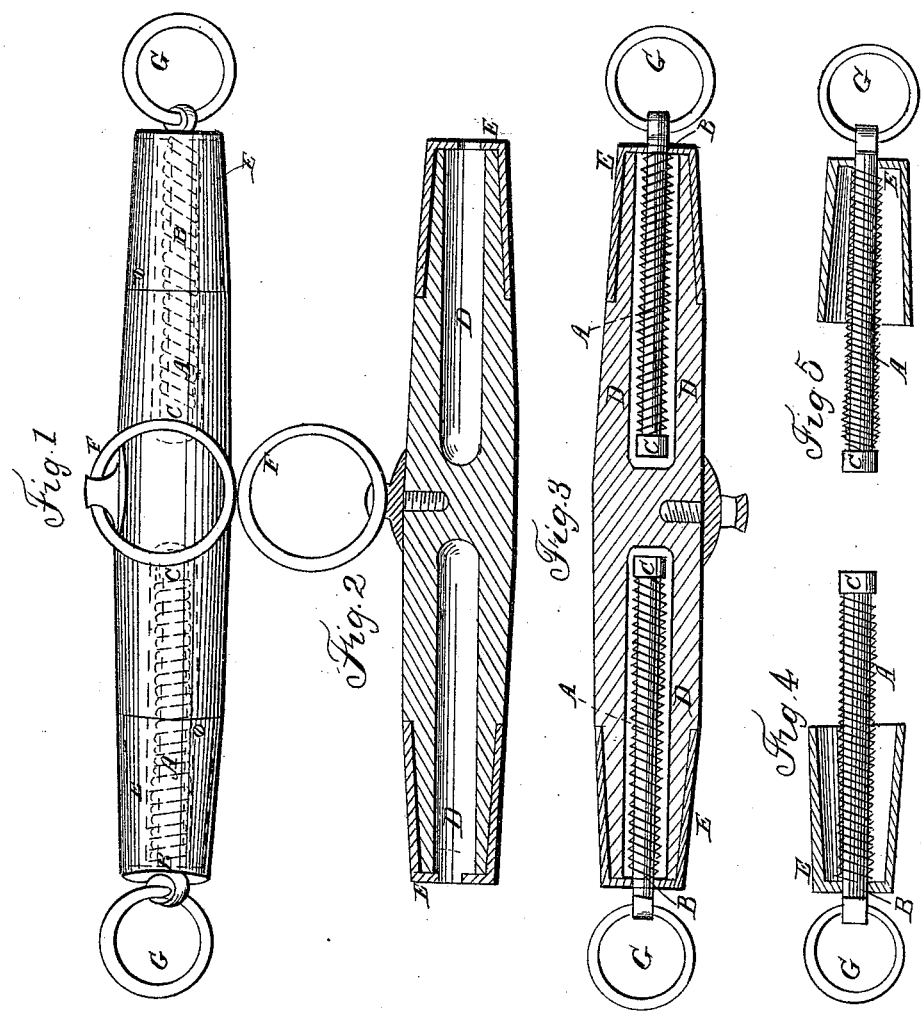

UNITED STATES PATENT OFFICE.

CALVIN L. RAWDON, OF BRISTOL, OHIO.

NECK-YOKE FOR HORSES.

Specification of Letters Patent No. 9,201, dated August 17, 1852.

*To all whom it may concern:*

Be it known that I, CALVIN L. RAWDON, of Bristol, in the county of Trumbull and State of Ohio, have invented a new and Improved Mode of Constructing Neck-Yokes for Double Harness; and I do hereby declare that the following is a full, clear, and exact description of the same, reference being had to the annexed drawings, making part of this specification, in which—

Figure 1 is a view of a yoke with my improvement attached; Figs. 2 and 3 longitudinal sections; Figs. 4 and 5 views of my improvement detached from the yoke.

Like letters refer to similar parts in the different views.

The yoke, Fig. 1, is made in the usual form to which is attached the improvement which consists in having the spiral spring A A, Fig. 1, encircle the rods B B which have a head or nut C C secured to the inside end. The rods and springs are placed in the chambers D D, as seen in Figs. 2 and 3. The rods B B pass through the ends of the ferrules E E through which they move by the extension and contraction of the springs A A which in all cases readily adjust themselves to the action of the team without straining or galling the neck or shoulders and allows the team to work together with ease which is the desired object particularly so on bad roads.

The ferrules E E, Figs. 4 and 5, are fitted over the ends of the yoke and secured by screws or other device as seen in Fig. 1. The nuts or heads C C, Figs. 4 and 5, with the inside of the ferrules E E form shoulders for the action of the spring B B as shown in place in Figs. 1 and 3. The nut or head, C C acts also as guides for the rods and springs in the chambers D D, Fig. 2. The ring, Fig. 1, is to receive the tongue or pole and rings G G for the yoke straps.

What I claim as my improvement, and desire to secure by Letters Patent, is—

The spiral springs operated by the rods giving extension and contraction to the yoke in the manner and for the purpose herein set forth.

CALVIN L. RAWDON.

Witnesses:
WILLIAM MACK BRIDE,
ZENERS E. HILLMAN.